United States Patent [19]
Klerks et al.

[11] Patent Number: 5,439,718
[45] Date of Patent: Aug. 8, 1995

[54] MULTILAYER CONTAINER OF POLYCARBONATE AND AMORPHOUS POLYAMIDE OF IMPROVED BARRIER AND STRESS CRACK RESISTANT PROPERTIES

[75] Inventors: Thomas M. Klerks, Bergen op Zoom, Netherlands; Robert S. Thayer, Pittsfield, Mass.; G. Fred Willard, Parkersburg, W. Va.; Thomas P. Dunton, Lebanon Springs, N.Y.; John H. C. Young, Jisp, Netherlands

[73] Assignee: General Electric Company, Pittsfield, Mass.

[21] Appl. No.: 95,324

[22] Filed: Jul. 21, 1993

[51] Int. Cl.6 .............................. B65D 23/00
[52] U.S. Cl. ................... 428/35.7; 428/36.91; 428/36.6; 428/412; 428/475.2; 428/480; 428/474.4
[58] Field of Search ............. 428/36.91, 36.6, 36.7, 428/35.7, 412, 475.2, 480, 474.4

[56] References Cited

U.S. PATENT DOCUMENTS

| 4,513,037 | 4/1985 | Collins | 428/35.7 |
| 4,826,955 | 5/1989 | Akkapeddi et al. | 428/35.7 |
| 4,973,130 | 6/1990 | Clagett et al. | 428/35.7 |

FOREIGN PATENT DOCUMENTS

| 0280736 | 9/1988 | European Pat. Off. |
| 0325030A2 | 7/1989 | European Pat. Off. |
| 0378856 | 7/1990 | European Pat. Off. |
| 0423504A2 | 4/1991 | European Pat. Off. |
| 4142978C1 | 12/1992 | Germany |

OTHER PUBLICATIONS

Ser. No. 07/827,855 Willard—Multilayered Structure Comprising Polycarbonate Layers and Functionalized Polyamide Layers—Filed Jan. 30, 1992.

*Primary Examiner*—Charles R. Nold

[57] ABSTRACT

Multilayered containers comprising polycarbonate layers and amorphous polyamide layers wherein the amorphous polyamides are modified and unmodified amorphous polyamides of high glass transition temperatures. The containers have improved stress craze/crack resistance and improved rewashing properties. The containers are useful for carbonated beverages and are rewashable and refillable at elevated temperatures.

4 Claims, No Drawings

MULTILAYER CONTAINER OF POLYCARBONATE AND AMORPHOUS POLYAMIDE OF IMPROVED BARRIER AND STRESS CRACK RESISTANT PROPERTIES

BACKGROUND OF THE INVENTION

1. Field of the Invention

The present invention is directed to multilayer containers of aromatic polycarbonate layers and particular amorphous polyamide layers, and more particularly to multilayer containers having improved stress craze and crack resistance and improved rewashing properties at elevated temperatures by utilizing particular amorphous polyamide layers in combination with polycarbonate layers.

2. Description of Related Art

Multilayer containers are well known in the prior art containing layers of polycarbonate and amorphous polyamides. Such prior art includes U.S. Pat. No. 4,513,037 to Collins which discloses polycarbonate and gas barrier layer containers having good barrier properties and good impact strength. Specifically, the reference discloses an outer layer of a polycarbonate, an intermediate gas barrier layer of either a polyester or an acrylonitrile or polymers of ethylene and vinyl acetate, and an inner layer of a polycarbonate.

Another U.S. Pat. No. 4,937,130 to Clagett et al discloses multilayer containers of an aromatic polycarbonate outer layer, an amorphous intermediate layer and an inner layer of a polycarbonate. The container of the patent is said to have excellent barrier properties and hot fill capabilities. Specifically, the reference discloses that adjacent to the intermediate layer is at least one layer of a blend of amorphous polyamide and aromatic polycarbonate, which layer provides adhesion between the polycarbonate and amorphous polyamide layer.

U.S. patent application Ser. No. 07/423309 filed Sep. 18, 1989, now abandoned and continuation patent application thereof Ser. No. 07/827,855 filed Jan. 30, 1992, both assigned to the same assignee of the instant patent application also discloses a multilayer container having an outer aromatic polycarbonate layer and an inner amorphous polyamide layer wherein the amorphous layer is composed of an amine functionalized polyamide. The multilayer container of the pending patent application Ser. No. 07/827,855 has good adhesion between the polycarbonate and the amine functionalized amorphous polyamide layer.

With the demand for containers that are reuseable in order to reduce the refuse problem facing the world, new concepts in thermoplastic resin bottles have been considered for such reuse to help solve the problem such as being rewashable and refillable. Certain polyethylene terephthalate (PET) bottles are not able to meet multiple rewashing and refilling. Heavy walled PET containers have been made but still lack the ability to withstand multiple wash cycles, particularly hot wash cycles because the PET containers are made of biaxially oriented PET. Thus when containers are rewashed at temperatures in excess of 60° C. which is near the glass transition temperature (Tg) of the biaxially oriented PET, the container severely shrinks and thereby loses volume by shrinking down from its original capacity.

Other monolayer and certain multilayer containers started to emerge showing promise of having the ability to be rewashable and refillable. Success has been achieved for certain non-carbonated juices and non-carbonated water. Such containers are rewashable and refillable and some can even be hot filled with certain juices. However, successful containers for carbonated beverages wherein the containers have good gas barrier properties and can endure multiple rewashing and refilling are still wanted. With the large number of throw away plastic containers being disposed of daily, there is the need for multiple rewashable and refillable plastic containers for carbonated beverages.

Therefore, it is an object of the instant invention to provide a multilayer container that has the ability to withstand repeated washing cycles with hot solutions. Another object of the instant invention is to provide a multilayer container that is resistant to stress crazing and cracking when under internal pressure. Still another object of the instant invention is to provide a multilayer container that is rewashable and refillable for carbonated beverages while still maintaining clarity and container integrity.

SUMMARY OF THE INVENTION

The instant invention is directed to a multilayer container having improved stress crazing and cracking resistance and improved gas and moisture barrier properties while maintaining container integrity after repeated rewashing and refilling. The multilayer container of the instant invention comprises in a direction from the outside of the container to the inside thereof a thermoplastic outer layer, a thermoplastic intermediate layer and a thermoplastic inner layer. The layers normally do not adhere to each other except where two adjacent layers are chemically similar. Therefore, the use of tie layers or adhesives are not needed. If any adhesion takes place it would be through any melt bonding occurring of chemically similar adjacent layers. Nevertheless, the layers are not intentionally bonded to each other. The outer layer comprises an aromatic polycarbonate or a combination of different polycarbonate layers or a combination of a polycarbonate layer and a particular amorphous polyamide layer. The intermediate layer comprises an amorphous polyamide layer or a combination thereof with other thermoplastic layers; and the inner layer comprises either an aromatic polycarbonate layer or an amorphous polyamide layer or a combination of such layers.

DETAILED DESCRIPTION OF THE INVENTION

As stated previously, the instant invention is directed to a multilayer container having specific properties of improved stress craze and crack resistance and improved washing at elevated temperatures while still maintaining container integrity and clarity after repeated washing and filling.

The multilayer container can comprise three or more adjacent layers. Starting from outside of the container and moving in a direction toward the inside thereof, the outer layer can be an unmodified aromatic polycarbonate or a silicone modified polycarbonate or a combination of an unmodified aromatic polycarbonate layer and a silicone modified polycarbonate layer. As used herein, an unmodified polycarbonate is one other than a silicone modified aromatic polycarbonate, which silicone modified aromatic polycarbonate is hereinafter defined.

The unmodified aromatic polycarbonates employed in the instant invention are well known polymers and are disclosed in many U.S. patents such as U.S. Pat. Nos. 2,999,835, 3,038,365, 3,334,154 and 4,131,575 all of which are incorporated herein by reference. Such unmodified aromatic polycarbonates are prepared from dihydroxy phenols and carbonate precursors. The polycarbonates suitable for use in the instant invention generally have a number average molecular weight of from about 8,000 to about 150,000 and preferably from about 10,000 to about 80,000 and an intrinsic viscosity (I.V.) of about 0.40 to about 1.0 deciliters per gram (dl/g) as measured in methylene chloride at 25° C.; hereafter all intrinsic viscosities are expressed as I.V. (dl/g and are measured in methylene chloride at 25° C.).

Suitable dihydroxy phenols employed in the preparation of the unmodified polycarbonates include for example 2,2-bis(4-hydroxyphenyl) propane, bis(4-hydroxyphenyl) methane, 2,2-bis(4-hydroxy-3-methylphenyl)-propane, 4,4-bis(4-hydroxyphenyl)heptane, 2,2,-(3,5,3',5'-tetrachloro-4,4'-dihydroxyphenyl)propane, 2,2-(3,5,3',5'-tetrabromo-4,4'-dihydroxyphenyl)propane, and 3,3'-dichloro-4,4'-dihydroxydiphenyl) methane. Other dihydroxy phenols which are also suitable for use in the preparation of the above polycarbonates are also disclosed in the above references which have been incorporated herein by reference.

It is of course possible to employ two or more different dihydroxy phenols in preparing the unmodified polycarbonates of the invention. In addition, branched polycarbonates such as those described in U.S. Pat. No. 4,001,184 can also be utilized in the practice of the instant invention, as well as blends of a linear unmodifed aromatic polycarbonate and a branched aromatic polycarbonate. The preferred unmodified polycarbonates to be employed in the practice of this invention are the branched polycarbonates. The branched polycarbonate resins may be prepared by reacting (i) at least one dihydroxy phenol of the type described herein, (ii) a carbonate precursor, and (iii) a minor amount of a polyfunctional organic compound. The polyfunctional organic compounds used in making the branched polycarbonates are well known in the art and are disclosed, for example, in the U.S. Pat. Nos. 3,525,712; 3,541,049; 3,544,514; 3,635,895; 3,816,373; 4,001,184; 4,294,953 and 4,204,047, all of which are hereby incorporated herein by reference. These polyfunctional organic compounds are generally aromatic in nature and contain at least three functional groups which may be, for example, hydroxyl, carboxyl, carboxylic anhydride, haloformyl, and the like. Some illustrative non-limiting examples of these polyfunctional compounds include trimellitic anhydride, trimellitic acid, trimellityl trichloride, 4-chloroformyl phthalic anhydride, pyomellitic dianhydride, mellitic acid, mellitic anhydride, trimeric acid, benzophenonetetracarboxylic acid, benzophenonetetracarboxylic anhydride, and 4,6-dimethyl-2,4,6-tri-(4-hydroxyphenyl)heptene-2. The amount of this polyfunctional organic compound or branching agent used is in the range of from about 0.05 to about 2 mole percent based on the amount of dihydric phenol employed, and preferable from about 0.1 to about 1 mole percent.

The silicone modified polycarbonate employed in the practice of the instant invention is a block copolymer of an aromatic polycarbonate and an organopolysiloxane wherein the organopolysiloxane blocks consist of at least 5 units per block and preferably 10 to 80 units per block and in particular 20 to about 50 units per block. The polycarbonate-organopolysiloxane block copolymer can essentially comprise a random block copolymer or an alternating block copolymer or recurring units of blocks of organopolysiloxane. The ratio of the polycarbonate block units to the organopolysiloxane block units may vary from about 0.05 to about 3 inclusive. The ratio of the blocks can vary within the above limits but the ratio should not be considered as limiting since the important criteria is that the silicone modified polycarbonate layer of the instant container invention provides improved environmental stress crack resistance and is transparent or translucent.

The block copolymers described above are also referred to as silicone modified polycarbonates and are preferably employed as at least one of the layers in the instant invention. They can be prepared by reacting, at temperatures in the range of 0° C. to 100° C., preferably, 20° C. to 50° C., and in the presence of an acid acceptor, a mixture of a halogen chain-stopped poly-diorganosiloxane and a dihydroxy phenol and thereafter phosgenating said reaction product until the resulting copolymer achieves the desired or maximum intrinsic viscosity.

Another procedure that can be employed in preparing the organopolysiloxane used in preparing the silicone modified polycarbonate of the instant invention involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4% to about 35% by weight, and preferably from about 1% to about 10% by weight of said halogen chain-stopped polysiloxane. The halogen chain-stopped polysiloxane is preferably in the form of a chlorinated polydimethylsiloxane.

Dihydroxyphenols that can be included in preparing the silicone modified polycarbonate of the instant invention are those listed previously herein and which are disclosed herein as being suitable in preparing the unmodified aromatic polycarbonate.

Materials of the above nature, i.e. the silicone modified polycarbonate employed herein and the process for making them are disclosed in U.S. Pat. Nos. 3,189,662 and 3,831,325 and 3,832,419 which are incorporated herein by Further descriptive disclosures can reference. also be found in U.S. Pat. No. 4,198,468 incorporated herein by reference.

The processes for preparing the unmodified polycarbonate employed in the instant invention are well known in the art. There are many patents fully describing the preparation of the polycarbonates including those recited previously herein, and as well as U.S. Pat. Nos. 4,937,130 and 4,513,037 both of which are incorporated herein by references.

As described in the prior art, a carbonate precursor is employed to prepare the polycarbonates such as a carbonyl halide, a carbonate ester or a haloformate. Typically the well known carbonate precursor is a carbonyl chloride. A typical carbonate ester is diphenyl carbonate. A typical haloformate is a bishaloformate of a dihydroxyphenol such as the bishaloformate of ethylene glycol. The above carbonate precursors are merely typical of those that can be employed and are not intended to be limiting. Such carbonate precursors are also well known in the art and are listed in the prior art cited previously herein.

The polycarbonate employed herein may also be a copolyestercarbonate as described in U.S. Pat. No. 4,430,484 and in the other references cited in U.S. Pat. No. 4,430,484, which is incorporated herein by reference. Preferred polyestercarbonates are those derived from the dihydroxyphenols and carbonate precursors described above and aromatic dicarboxylic acids or their relative derivatives thereof, such as the acid dihalides, e.g. dichlorides. In addition a mixture of dicarboxylic acids can be employed such as terephthalic acid and isophthalic acid. Further their respective acid chlorides can also be used. Thus a useful class of aromatic polyestercarbonates are those prepared from bisphenol-A, terephthalic acid or isophthalic acid or a mixture thereof and a carbonyl chloride also known as phosgene. These copolyestercarbonates are also commonly known as polyphthalate carbonates and are also described in U.S. Pat. No. 4,465,820, incorporated herein by reference.

The amorphous polyamide utilized in producing the multilayer container of the instant invention consists of one or more different types of amorphous polyamides as described herein each having certain specific properties or characteristics. The amorphous polyamide suitable for use as the barrier layer or intermediate layer is an amorphous polyamide prepared from the reaction product of hexamethylenediamine, isophthalic and/or, terephthalic acid and bis(3-methyl-4-amino-cyclohexyl)methane. This amorphous polyamide suitable as a barrier layer should have a dry glass transition temperature (Tg) of at least 130° C. and preferably about 140°–180° C. and more particularly 150°–160° C. The Tg of this amorphous polyamide of the present invention can be controlled by the amount of hexamethylenediamine (HMDA) employed in the reaction for producing the amorphous polyamide. For example by employing a higher content of HMDA, a lower Tg is obtained, and, conversely, the lower the HMDA the higher the Tg. However higher or lower Tg amorphous polyamide may be employed depending upon the effectiveness of the amorphous polyamide layer in the instant invention. However, in all cases the dry Tg of the amorphous polyamide should be at least 130° C. In addition, U.S. Pat. No. 4,983,719 discloses methods for preparing certain amorphous polyamides and is incorporated herein by reference. Such polyamides disclosed therein are prepared from para-xylylenediamines.

As the polyamide layer absorbs moisture, the Tg drops to a Tg that may result in whitening thereof upon exposure to washing and elevated temperatures of about 70° C. or higher. For example, when employing an amorphous polyamide having a dry Tg of about 125° C. or less, a 4% moisture absorption can lower the (Tg) to about 70° C. A moisture absorption of about 7% could lower the (Tg) of the amorphous polyamide layer to about 60° C. By employing an amorphous polyamide layer as the barrier or intermediate layer having a dry Tg of at least 130° C. and preferably 140° C. to 180° C. and in particular 150°–160° C., moisture absorption of the polyamide does not reduce the Tg of the polyamide layer to a Tg where whitening or opaqueness occurs upon exposure to moisture.

It has been also discovered that by employing a particular modified amorphous polyamide layer disposed between an intermediate barrier amorphous polyamide layer and the contents of the container, the amorphous polyamide intermediate or barrier layer is protected against substantial moisture pick up, as well as environmental stress craze/ crack resistance. This particular modified amorphous polyamide is the reaction product, for example, of hexamethylenediamine, isophthalic acid, bis(3-methyl-4-amino cyclohexyl)methane and lauryl lactam. The lactam employed herein is preferably lauryl lactam but may be any $C_8$–$C_{13}$ aliphatic lactam. In this reaction some minor amounts of terephthalic acid can be tolerated but is not necessary and preferably not used in the reaction.

A method for preparing the lactam modified amorphous polyamide of the instant invention involves reacting 5–40 mole % of hexamethylenediamine, 5–40 mole % of bis(3-methyl-4-aminocyclohexyl)methane, 10–45 mole % of isophthalic acid and 10–80 mole % of lauryl lactam.

The reaction can be an interfacial condensation reaction and can be carried out at a temperature of about 50° C. The end product has a Tg of about 145°–150° C. but can be higher or lower depending upon the end use application of the container.

The lactam modified amorphous polyamide is dimensionally stable relative to crystalline polyamides, is transparent and is chemically resistant.

Optionally, the lactam modified amorphous polyamide layer disclosed above, in order to further protect the amorphous polyamide intermediate layer from substantial moisture or water vapor pickup, can have adjacent thereto an inner layer comprised of the silicone modified polycarbonate, which is described above. Thus, the combination of the lactam modified amorphous polyamide layer and the added silicone modified polycarbonate layer thereover provides good protection for the intermediate or barrier amorphous polyamide layer from substantial moisture absorption and also provides environmental stress craze/cracking resistance.

Optionally, in place of the lactam modified amorphous polyamide layer, the inner layer can comprise in combination and adjacent to each other two layers of aromatic polycarbonate wherein the inner layer is derived from a silicone modified polycarbonate and the other layer adjacent thereto is an unmodified polycarbonate layer. The silicone modified polycarbonate layer provides environmental stress craze/crack resistance, and chemical resistance.

Alternatively, the multilayer container can comprise a four-layer container wherein the outer layer is a branched aromatic polycarbonate as described previously herein, the intermediate or barrier layer is an amorphous polyamide layer having a dry Tg of at least 130° C. and preferably 140°–180° C. and in particularly 150°–160° C., and the inner layer comprises two layers of an aromatic branched polycarbonate. While this results in one thicker polycarbonate layer since the two separately coextruded layers would melt blend into one layer, the use of a one layer extrusion channel or a two layer extrusion channel or more is the choice of the fabricator and is not intended to limit the scope of the instant invention.

The amorphous polyamide layer or layers as used in the instant invention may have, although not critical, an apparent melt viscosity somewhat similar to the apparent melt viscosity of the polycarbonate resin at the extrusion temperature. Preferably the amorphous polyamide layer or layers has an apparent melt viscosity sufficiently high to permit coextrusion with the aromatic polycarbonate layer at a temperature of about 300° C. and a glass transition temperature (Tg) sufficiently high to permit shape retention and rewashing while remaining transparent or translucent. Of course, the coextrusion temperature can vary from 250° C. to about 350° C. and can vary from module to module in the extrusion head depending upon the melt flow and melt viscosity of the individual layers being coextruded.

In the practice of the instant invention, the multilayered containers may be prepared by coextrusion blowmolding. The containers may be prepared by a method comprising first coextruding the various layers of the material, forming a parison, and then blowmolding the parison prior to its solidifying. The number of extrusion channels in the extrusion head depends on the number of layers being extruded. Preferably the coextrusion apparatus is that which is disclosed in U.S. Pat. No. 5,069,612 and U.S. patent application Ser. No. 07/797,021 filed Nov. 25, 1991 and Ser. No. 07/836,726 filed Feb. 19, 1992 all of which are incorporated herein by reference.

The thickness of the layers may be the same or may be varied depending upon the shape of the container, the liquid to be contained therein, the desired strength of the container, the rewashing cycle, the rewashing temperature and rewashing solution. The combined minimum thickness of the layers forming the wall of the container is controlled by the fact that this wall should be thick enough to provide sufficient strength, stiffness, rigidity, and integrity to serve as an effective enclosure and container for a variety of materials, particularly carbonated liquids, placed within the container. Generally, this minimum wall thickness may vary from about a few mils to 20 mils or more depending on the container structure, wash temperatures, material to be contained therein and pressure within the container. The maximum combined thickness of the layers forming the walls of the container is not critical but is also governed by such secondary considerations as appearance, cost, weight, and the like. As a non-limiting illustration bottles formed from the instant three layer structure generally may have a combined side wall thickness of from about 20 to about 70 mils. However, when forming the container the base of the container will generally have a thicker wall section than the side wall thereof. For example, if the base has a contour base for free standing the wall thickness of the contour may be thicker than the side wall and may vary from about 50 to about 150 mils. If the base is spherical, for example, the wall thickness of the spherical base may not need to be as thick as a contour base but would probably be thicker than the side wall of the container.

The minimum thickness of the intermediate layer is such that said layer is effective in functioning as a gas-barrier layer, i.e., exhibiting substantial gas-barrier properties. Generally, however, this minimum thickness may be about 5 mils, and preferably about 10 mils. The upper thickness range of the intermediate layer is not critical but is controlled by such secondary considerations as cost, ease of fabrication, appearance, bottle weight and the like.

The minimum thickness of the inner and outer layers is generally a thickness which is effective in protecting the gas-barrier resinous intermediate layer from the deleterious effects of external environmental factors such as heat, high humidity, hot washing solutions, and the like to which the intermediate layer may be sensitive. It is also dependent upon performance of the container, impact resistance, weight, clarity, container integrity and suitability to withstand elevated pressures, such as from carbonated liquids. Base design of the container can also be an important factor dictating layer thicknesses. However, the thickness of the individual layers and overall thickness including base thicknesses are merely illustrative and are not intended to be limiting.

The containers of the instant invention are multilayer containers comprising at least three layers adjacent to each other wherein the multi-layer container has improved environmental stress craze/crack resistance and improved rewashing properties. Progressing in a direction from outside the container to the inside thereof, the first layer is the outer layer which comprises an aromatic polycarbonate having an intrinsic viscosity of at least 0.40 deciliters per gram as measured in methylene chloride at 25° C. and a number average molecular weight of about 8,000 to about 150,000 or it may comprise two or more layers of different polycarbonates such as a branched polycarbonate layer and a silicone modified polycarbonate layer, or it may comprise a branched polycarbonate layer and a lactam modified amorphous polyamide layer. The next layer is the intermediate or gas barrier layer wherein the intermediate layer comprises at least one layer comprising an amorphous polyamide other than $C_8$-$C_{13}$ aliphatic lactam modified amorphous polyamide, having a glass transition temperature (Tg) of at least 130° C. and preferably about 140°-180° C. and more particularly about 150°-160° C. or a combination thereof with polycarbonate layer of the type described above. The next layer is the inner layer wherein the inner layer comprises a lactam modified amorphous polyamide or an aromatic polycarbonate layer or a combination of both layers. The aromatic polycarbonate layer may be a branched polycarbonate layer or a silicone modified polycarbonate layer or a combination of both polycarbonate layers. In either case, if the inner layer consists of more than one polycarbonate layer, it is preferred that the innermost layer thereof be a silicone modified polycarbonate layer as described previously since this inner layer of the silicone modified polycarbonate provides environmental stress craze/crack resistance.

The multilayer container of the instant invention can also comprise an outer layer of a silicone modified polycarbonate layer comprising a block copolymer of a polycarbonate and an organopolysiloxane, an aromatic polycarbonate layer adjacent thereto wherein the polycarbonate is other than a silicone modified polycarbonate, an intermediate layer adjacent thereto comprising an amorphous polyamide layer having a glass transition temperature of at least 130° C. and preferably about 140° to 180° C. and more particularly about 150°-160° C. and an inner layer comprising an unmodified polycarbonate layer being adjacent to the amorphous polyamide layer and another layer adjacent to the polycarbonate layer which is a silicone modified polycarbonate as described previously.

While the instant invention is directed to containers employing certain layers of thermoplastic resin as disclosed herein, it is also within the scope of the instant invention that regrind thermoplastic resin from the various thermoplastic layers employed herein can be added to any of the appropriate corresponding melt layers during coextrusion of the thermoplastic layers. Such regrind can be that obtained upon separation of the layers or it can also consist of blends of the regrind material such as blends of the polycarbonate and amorphous polyamide employed herein. The amount of regrind that can be employed depends upon the container application, wash cycles, etc., but would need to be such as not to effect the properties of the container, i.e. stress craze/crack resistance and rewashing ability. The regrind can be either post manufactured or post consumer regrind.

The polycarbonate employed in the practice of the instant invention may have admixed therewith other commonly known and used additives such as antioxidants, hydrolytic stabilizers, ultraviolet radiation stabilizers, color stabilizers, impact modifiers and may even include such other additives as various types of fillers and mold release agents particularly where transparency is not wanted.

DESCRIPTION OF THE PREFERRED EMBODIMENT

The following examples are set forth to illustrate the instant invention and are not to be construed as limiting the scope of the invention thereto. Unless otherwise indicated, all parts and percentages are on a weight basis.

EXAMPLE I

This Example illustrates the preparation of a 1.5 liter bottle comprised of an outer layer of a branched aromatic polycarbonate blow molding grade polycarbonate (LEXAN 154 manufactured by General Electric Company) having an average molecular weight of about 12,000 number average and an intrinsic viscosity of about 0.50 deciliter per gram (dl/g) as measured in methylene chloride at 25° C., an intermediate layer of an amorphous polyamide having a glass transition temperature of about 120° C. and an inner layer of the same branched aromatic polycarbonate used for the outer layer. The container was prepared by coextrusion blow molding using a Bekum HBV 121 continuous coextrusion blow molding machine equipped with an extrusion head having three modules for extruding three layers and a multimodular combining head. A conventional blow molding process was used except that an air ring was employed passing air down the parison exposing the surface of the parison to air at a temperature less that of the parison. The coextrusion temperature was about 252° C. to about 260° C. and the die was set at about 265° C. The mold temperature was set at about 60° C. and a dummy mold was used on the opposite side to allow faster cycle rates. All resins were dried before use. The apparatus employed in this Example with the air ring is more fully described in U.S. patent application Ser. No. 07/836/726 filed Feb. 19, 1992 and U.S. Pat. No. 5,069,612 issued Dec. 3, 1991, both assigned to the same assignee of the instant invention.

The 1.5 liter bottle had a weight of about 120 grams empty. The outer polycarbonate layer was about 28 mils thick, the intermediate amorphous polyamide layer was about 9.5 mils thick and the polycarbonate inner layer was about 4.5 mils thick. The container was identified as PC/PA1/PC.

EXAMPLE II

Example I was repeated except that the 1.5 liter container had an intermediate layer of an amorphous polyamide having a Tg of about 155° C. The container had an outer layer thickness of about 27.7 mils, and an intermediate layer thickness of about 7.8 mils and an inner layer thickness of about 4.5 mils. The container weighed about 120 grams empty. The container of the Example was identified as PC/PAX3/PC.

EXAMPLE III

Example II was repeated except that the 1.5 liter container had an inner layer of a lauryl lactam modified polyamide, instead of the aromatic branched polycarbonate of Example II, which modified polyamide was prepared by the condensation reaction of about 12.5 mole % of hexamethylenediamine, about 25 mole % of isophthalic acid, about 12.5 mole % of bis(3-methyl-4-aminocyclohexyl)methane and about 50 mole % of lauryl lactam. The amorphous polyamide had a Tg of about 145° C. The container weighed 120 grams, and the outer layer was 21 mils thick, the intermediate layer was 14 mils thick and the inner layer was 5.2 mils thick. The container was identified as PC/PAX3/PAR5.

EXAMPLE IV

Example III was repeated except that the 1.5 liter container was a coextruded 4 layer container wherein the outer layer was a lauryl lactam modified amorphous polyamide of the type used in Example III above, the next adjacent layer was a branched polycarbonate of the type used in Example I above, the next adjacent layer was an amorphous polyamide of the type employed in Example II above, and the inner layer was the lauryl lactam modified amorphous polyamide employed as the outer layer in this Example. The extruder employed was equipped with a four module head for coextruding four layers. The bottle weighed 120 grams empty and had an outer layer thickness of 10.5 mils, the next polycarbonate layer and polyamide layer had a combined thickness of about 27 mils and the inner lauryl lactam modified amorphous polyamide had a thickness of about 3.4 mils. The container was identified as PAR5/PC/PAX3/PAR5.

EXAMPLE V

Example IV was repeated except that the container had an outer layer of a block copolymer of a polycarbonate and an organopolysiloxane wherein the organopolysiloxane consisted of about 50 units per block thereof and the copolymer had an I.V. of about 0.50 dl/g. The next layer adjacent thereto was an amorphous polyamide layer having a Tg of about 155° C. The next layer adjacent to the polyamide layer was a branched polycarbonate of the same type used in Example IV. The inner layer was a lauryl lactam modified amorphous polyamide of the type used in Example IV. The container had a weight of about 120 grams empty, and the outer layer had a thickness of about 3.6 mils, the next polyamide layer had a thickness of about 7.7 mils, the next polycarbonate layer had a thickness of about 25.9 mils and the inner lactam modified amorphous polyamide layer had a thickness of about 3.7 mils. The container was identified as PC50/PAX3 /PC/PAR5.

EXAMPLE VI

The containers of Example I through V were subjected to various wash solutions. Two containers from each Example were immersed in each wash solution for 16 hours at 80° C. The containers were then visually examined for any cracks, bubbles in any of the layers, whitening or delamination.

The results were as follows:

| Examples | 1.5% Caustic Solution | 3.0% Caustic Solution |
|---|---|---|
| I PC/PA1/PC | bubbles in PA1 layer-whitening to opaque | bubbles in PA1 layer-whitening to opaque |
| II PC/PAX3/PC | clear-no crazing or cracks | clear-no crazing or cracks |
| III PC/PAX3/PAR5 | clear-no crazing or cracks | clear 2 cracks at pinch off weld* |
| IV PAR5/PC/PAX3/PAR5 | clear-no crazing or cracks | clear-no crazing or cracks |
| V PC50/PAX3/PC/PAR5 | clear-no crazing or cracks | clear-no crazing or cracks |

*A defect was subsequently discovered in the mold with respect to the pinch off of the base of the container and was corrected. The 2 cracks were due to the defective mold.

As can be seen from the above Examples, the containers of the instant invention were able to withstand soaking in caustic wash solution at 80° C. for at least 16 hours. The control Example I did not pass this soaking test. This demonstrates that the containers of the instant invention would be able to undergo repeated washings at 80° C. or less in caustic solutions.

This next set of Examples illustrates the stress crazing and cracking resistance of the multilayer containers of this invention at various pressures induced within the container at room temperature. This test determines the suitability of the instant containers for carbonated liquids.

EXAMPLE VII 1.5 liter containers were made by repeating Example III above. Five containers for each pressure test were employed, filled with carbonated water and subjected to various internal pressures maintained within the container. The containers were checked periodically for any visual signs of stress cracking due to the pressure within the containers.

The results were as follows:

| Pressure Within Container | Days Under Test | Visual Observation |
|---|---|---|
| 30 lbs./sq. in. | 108 | NCC |
| 40 | 108 | NCC |
| 50 | 108 | NCC |
| 60 | 108 | NCC |

NCC — no crazing or cracks

EXAMPLE VIII

Example VII was repeated except that the containers were made using Example II above.
The results of the test were as follows:

| Pressure Within Container | Days Under Test | Visual Observation |
|---|---|---|
| 30 | 108 | NCC |
| 40 | 108 | NCC |
| 50 | 108 | NCC |
| 60 | 108 | NCC |

NCC — no crazing or cracks

EXAMPLE IX

Example VIII was repeated except that instead of carbonated water, flavored carbonated beverages were used.
The results were as follows:

| Example | Flavor | Days Under Internal Pressure | Visual Observation |
|---|---|---|---|
| PC/PAX3/PAR5 | Orange | 108 | Slight delamination in base of one container |
|  | Pepsi | 108 | No cracking or delamination |

EXAMPLE X

Example VIII was repeated and the containers were molded using the same molding conditions and equipment used in Example I except that the containers were four layer containers wherein the outer layer was the block copolymer of Example V, the next adjacent layer was the branched polycarbonate of Example V, the next layer was the amorphous polyamide layer of Example V, and the inner layer was the lauryl lactam amorphous polyamide layer of Example V. The thickness of the layers were from the outer layer to the inner layer respectively 3.6 mils, 25.0 mils, 8.0 mils and 3.6 mils. The containers were identified as PC50/PC/PAX-3/PAR5.

The results were as follows:

| Example | Flavor | Days Under Internal Pressure | Visual Observation |
|---|---|---|---|
| PC50/PC/PAX3/PAR5 | Orange | 61 | No cracking or delamination |
|  | Pepsi | 61 | No cracking or delamination |

What is claimed is:

1. A multilayer container having improved stress craze/crack resistance and improved rewashing consisting of four layers adjacent to each other comprising (1) an outer layer, (2) an intermediate layer comprising a two layer composite, and (3) an inner layer where the outer layer (1) consists essentially of a polycarbonate-organopolysiloxane random block copolymer having at least 10 organopolysiloxane units per organopolysiloxane block and said inner layer (3) being a $C_8$–$C_{13}$ aliphatic lactam modified amorphous polyamide having a glass transition temperature of at least 130° C. and wherein said outer layer (1) and said inner layer (3) having disposed therebetween a two layer composite wherein the layer adjacent to the outer layer (1) is an amorphous polyamide having a glass transition temperature of at least 130° C. and the layer of said two layer composite adjacent to the inner layer (3) is a branched polycarbonate having an intrinsic viscosity of at least 0.40 deciliters per gram as measured in methylene chloride at 25° C.

2. The multilayer container of claim 1 wherein the intermediate layer (2) has a thickness effective for said intermediate layer to function as a gas-barrier layer.

3. The multilayer container of claim 1 wherein the said container is prepared by a coextrusion blowmolding process.

4. The multilayer container of claim 1 prepared by a coextrusion blowmolding process wherein layers of the multilayer container are extruded through a multi channel coextrusion die.

* * * * *